(12) United States Patent
Wang et al.

(10) Patent No.: US 12,316,662 B2
(45) Date of Patent: May 27, 2025

(54) SYSTEM AND METHOD FOR AUTOMATED INCIDENT GENERATION

(71) Applicant: Stellar Cyber, Inc., San Jose, CA (US)

(72) Inventors: Qi Wang, Champaign, IL (US); Zhichun Li, Santa Clara, CA (US); Jiaping Gui, Shanghai (CN); Shuchu Han, Princeton Junction, NJ (US)

(73) Assignee: Stellar Cyber, Inc., San Jose, CA (US)

( * ) Notice: Subject to any disclaimer, the term of this patent is extended or adjusted under 35 U.S.C. 154(b) by 290 days.

(21) Appl. No.: 18/155,030

(22) Filed: Jan. 16, 2023

(65) Prior Publication Data

US 2024/0244071 A1    Jul. 18, 2024

(51) Int. Cl.
*H04L 9/40* (2022.01)
*G06N 5/022* (2023.01)

(52) U.S. Cl.
CPC ......... *H04L 63/1425* (2013.01); *G06N 5/022* (2013.01); *H04L 63/1416* (2013.01)

(58) Field of Classification Search
None
See application file for complete search history.

(56) References Cited

PUBLICATIONS

Milajerdi et al., "Holmes: real-time apt detection through correlation of suspicious information flows," 2019 IEEE Symposium on Security and Privacy (SP), pp. 1137-1152. IEEE, 2019.
Hassan et al., "Tactical provenance analysis for endpoint detection and response systems," 2020 IEEE Symposium on Security and Privacy (SP), pp. 1172-1189. IEEE, 2020.

*Primary Examiner* — Brian Whipple
(74) *Attorney, Agent, or Firm* — Stellar IP

(57) ABSTRACT

The disclosure provides a system, a method and a computer program product for generating an automated incident. The system is configured to retrieve an alert of a plurality of alerts received from a plurality of heterogeneous sources. The alert is associated with a security breach. The system further generates a normalized alert based on normalization of the retrieved alert. The normalization is associated with a semantic similarity parameter. Further, the system generates an enriched alert based on enrichment of the generated normalized alert. The enrichment is based on security related data of the security breach associated with the generated normalized alert. The system further identifies a set of correlation features associated with the generated enriched alert. Furthermore, the system generates the automated incident associated with the alert based on at least the generated enriched alert and the identified set of correlation features associated with the enriched alert.

20 Claims, 9 Drawing Sheets

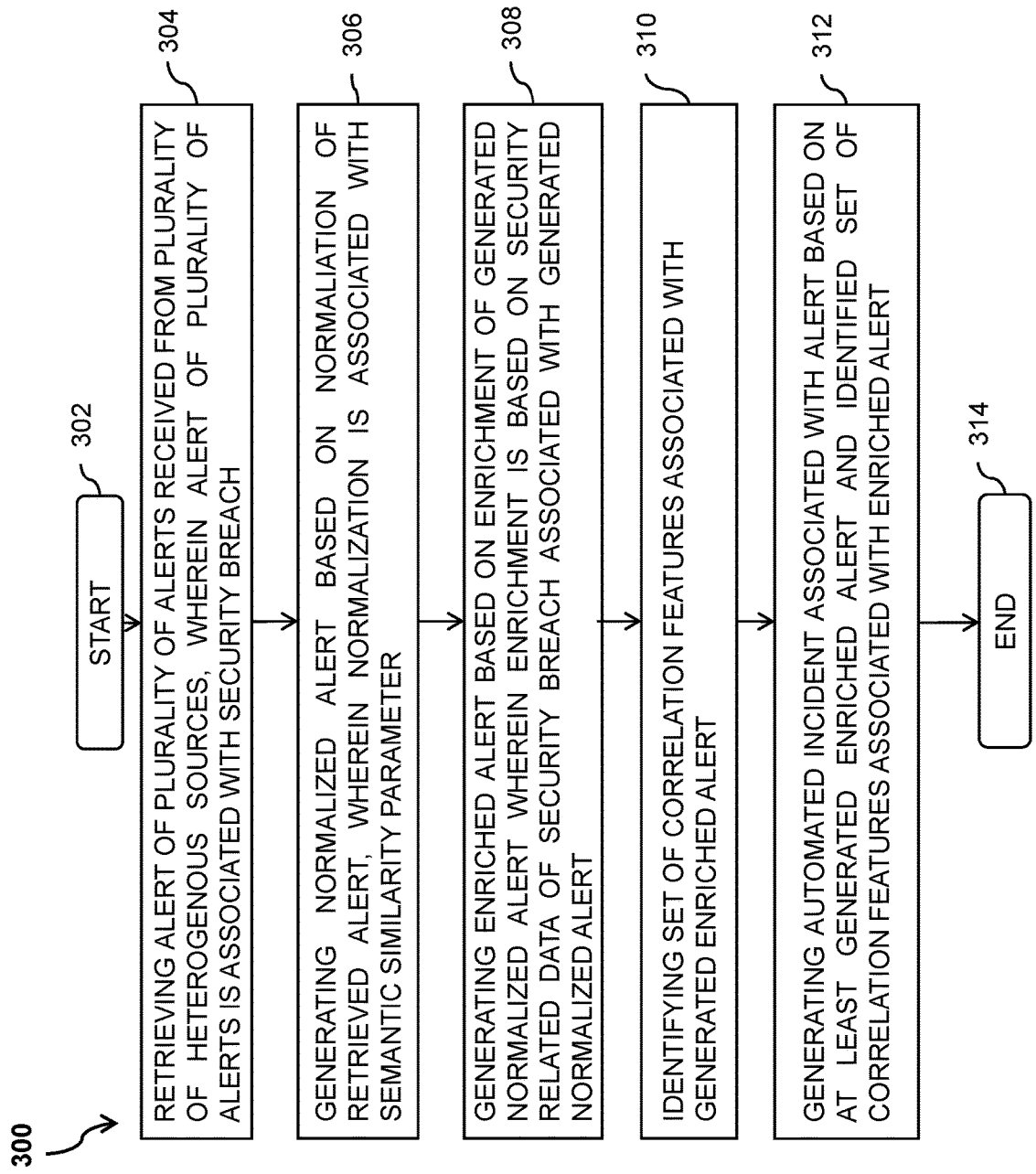

SYSTEM AND METHOD FOR AUTOMATED INCIDENT GENERATION

TECHNICAL FIELD

The present disclosure generally relates to machine learning based security alerts management, and more particularly relates to a system and a method for automated incident generation based on the security alerts.

BACKGROUND

Various types of data are used for security alert detections, including data from an endpoint to a network, from application logs to cloud application programming interfaces (APIs), and from users to Internet of Things (IoT) devices. Correspondingly, many tools and detectors have been deployed to capture possible attacks from different data sources. The emergence and adoption of Extended Detection and Response or Everything Detection and Response (XDR), which ingests heterogeneous data and alerts from different sources, enable users such as security analysts to perform investigation and response through a single platform and thus, providing better insights in a security posture of an enterprise. As more data sources are ingested in the XDR platform, more alerts are generated, which creates a backlog of investigation tasks for security analysts, thereby leading to a challenging problem of "alert fatigue." The problem of alert fatigue occurs when the user is exposed to a number of alerts, up to a point that it may become desensitizing and impact management of the alerts. While the alerts are designed to signal a potential problem, further investigation is required to confirm whether the alerts are genuine or not. On the other hand, users or security analysts need to manually group together a chain of low-level events from the different data sources to understand attacking activities.

Conventionally, several systems including security information and event management (SIEM) systems are used to manage alerts and combat alert fatigue. SIEM systems use readily available statistical features such as timestamps associated with the alerts. However, such SIEM systems are unable to precisely detect sophisticated attacks such as multi-stage advanced persistent threats (APT) attacks as they usually take place on different hosts and span a long duration. Moreover, the utilization of SIEM systems requires users or security analysts to possess technical experience and expertise, making the systems difficult to use. Other conventional systems consider only a single data source (for example, endpoint monitoring data) or homogenous sources for management of alerts. Security related data from other data sources may be unnoticed by the users. As a result, such conventional systems may be unable to accurately detect attack activities from the various data sources.

Therefore, it is desirable to provide a system or a method that is able to automatically manage alerts to counter the problem of alert fatigue.

SUMMARY

In one aspect, a system for automated incident generation is disclosed. The system includes at least one non-transitory memory configured to store computer executable instructions and at least one processor. The at least one processor is configured to execute the computer executable instructions. The execution of the computer executable instructions causes the at least one processor to retrieve an alert of a plurality of alerts received from a plurality of heterogeneous sources. The alert of the plurality of alerts is associated with a security breach. The execution of the computer executable instructions may further cause the at least one processor to generate a normalized alert based on normalization of the retrieved alert. The normalization is associated with a semantic similarity parameter. Furthermore, the execution of the computer executable instructions causes the at least one processor to generate an enriched alert based on enrichment of the generated normalized alert. The enrichment is based on security related data of the security breach associated with the generated normalized alert. The execution of the computer executable instructions may further cause the at least one processor to identify a set of correlation features associated with the generated enriched alert and to generate the automated incident. The automated incident is associated with the alert based on at least the generated enriched alert and the identified set of correlation features associated with the enriched alert.

In some embodiments, the at least one processor is further configured to identify a first predefined rule associated with a field of the retrieved alert. The first predefined rule is based on the semantic similarity parameter associated with the field of the retrieved alert, and the field of the retrieved alert is associated with at least one of: a field name or a field value type of the retrieved alert. In addition, the at least one processor, with facilitation of the alert normalization module, is configured to normalize the retrieved alert based on the identified first predefined rule.

In some embodiments, the at least one processor is further configured to apply a machine learning (ML) model on the retrieved alert, based on unsuccessful identification of the first predefined rule, to output the normalized alert. The ML model is trained to normalize the retrieved alert based on the semantic similarity parameter associated with the field of the retrieved alert.

In some embodiments, the at least one processor is further configured to identify a second predefined rule associated with the security related data of the security breach associated with the normalized alert. The security related data corresponds to at least one of: a tactic of the security breach, a technique of the security breach, a kill chain stage of the security breach, or a scope of the security breach. In addition, the at least one processor is further configured to enrich the normalized alert based on the identified second predefined rule.

In some embodiment, for the enrichment of the normalized alert, the at least one processor is further configured to apply an ML model on the normalized alert, based on unsuccessful identification of the second predefined rule, to output the enriched alert. The ML model is trained to enrich the normalized alert based on the security related data of the security breach associated with the normalized alert.

In some embodiments, to identify the set of correlation features, the at least one processor is configured to receive a set of alerts of the plurality of alerts received from the plurality of heterogeneous sources and utilize at least one of: a set of built-in features or a clustering model to identify the set of correlation features associated with the generated enriched alert and the received set of alerts. The clustering model is trained on the set of alerts to identify the set of correlation features associated with the generated enriched alert and the received set of alerts.

In some embodiments, the set of built-in features comprises at least one of: information of a user associated with the security breach, an asset associated with the security breach, an external host associated with the security breach a process associated with the security breach, a type of file associated with the security breach, or a registry associated with the security breach of the enriched alert.

In some embodiment, the set of correlation features comprises at least one of: an internet protocol geo location associated with the security breach of the enriched alert, a sensor identification (ID) associated with the security breach of the enriched alert, or a device ID associated with the security breach of the enriched alert.

In some embodiments, to generate the automated incident, the least one processor is further configured to generate a causal graph based on the generated enriched alert and the identified set of correlation features. The causal graph comprises one or more nodes and one or more edges. Each node of the one or more nodes represents a correlation feature of the identified set of correlation features, and each edge of the one or more edges represents a relationship between corresponding correlation features represented by corresponding nodes of the one or more nodes. In addition, the at least one processor is configured to generate the automated incident associated with the alert based on application of a graph ML model to the generated causal graph and external intelligence data associated with the security breach.

In some embodiments, the least one processor is further configured to utilize at least one of: a response and feedback associated with a user of the system, or monitoring data associated with the system to generate the causal graph.

In some embodiments, the least one processor is further configured to: transform the generated causal graph to a directed acyclic graph; and generate the automated incident associated with the alert based on application of the graph ML model trained to utilize the transformed directed acyclic graph.

In some embodiments, the at least one processor is further configured to generate an incident presentation based on application of an ML model using the generated automated incident associated with the alert. The ML model is based on a natural language processing technique.

In some embodiments, the generated incident presentation corresponds to at least one of: a contextualized alert description, an event summarization associated with the security breach, a tactical graph associated with the security breach, an incident timeline and summary, or an incident graph associated with the generated automated incident.

In a second aspect, a method for automated incident generation is disclosed. The method includes retrieving an alert of a plurality of alerts received from a plurality of heterogeneous sources. The alert of the plurality of alerts is associated with a security breach. The method further includes generating a normalized alert based on normalization of the retrieved alert. The normalization is associated with a semantic similarity parameter. In addition, the method includes generating an enriched alert based on enrichment of the generated normalized alert. The enrichment is based on security related data of the security breach associated with the generated normalized alert. The method further includes identifying a set of correlation features associated with the generated enriched alert. Furthermore, the method includes generating the automated incident associated with the alert based on at least the generated enriched alert and the identified set of correlation features associated with the enriched alert.

In a third aspect, a computer programmable product is disclosed. The computer programmable product includes a non-transitory computer readable medium having stored thereon computer executable instruction which when executed by at least one processor, causes the at least one processor to carry out operations for generating automated incidents. The operations include generating a normalized alert based on normalization of the retrieved alert. In addition, the operations include generating an enriched alert based on enrichment of the generated normalized alert. The enrichment is based on security related data of the security breach associated with the generated normalized alert. The operations further include identifying a set of correlation features associated with the generated enriched alert and generating the automated incident associated with the alert based on at least the generated enriched alert and the identified set of correlation features associated with the enriched alert.

It is to be understood that both the foregoing summary and the following detailed description are exemplary and explanatory only and are not restrictive of the invention, as claimed.

BRIEF DESCRIPTION OF FIGURES

The accompanying drawings, which are incorporated in and constitute a part of this disclosure, illustrate exemplary embodiments and, together with the description, serve to explain the disclosed principles.

FIG. 3 illustrates a flow chart of a method for automated incident generation, in accordance with an example embodiment.

DETAILED DESCRIPTION

In the following description, for purposes of explanation, specific details may be set forth in order to provide a thorough understanding of the present disclosure. It will be apparent, however, to one skilled in the art that the present disclosure can be practiced without these specific details. In other instances, some details of the systems, apparatuses, and methods may be omitted to avoid obscuring description of the present disclosure.

Embodiments of the present disclosure provide a system, a method, and a computer program product for automated incident generation. The system may be a machine learning-based system that solves "alert fatigue" problems by automatically correlating a set of alerts into meaningful incidents so that security analysts may focus on incidents which are usually several magnitudes less in number than alerts. The method broadly includes aggregation of alerts from heterogeneous sources and tools. In addition, the method may include normalization of alerts in a consistent format, and enrichment of normalized alerts with security related information. Further, the method may include identification of correlation features in the alerts, and incident creation. The method is not limited to the above-mentioned steps. These and other technical improvements of the disclosure will become evident from the description provided herein.

The system, the method, and the computer program product facilitating automated incident generation are now described with reference to FIG. 1A to FIG. 3.

Figure 1A:
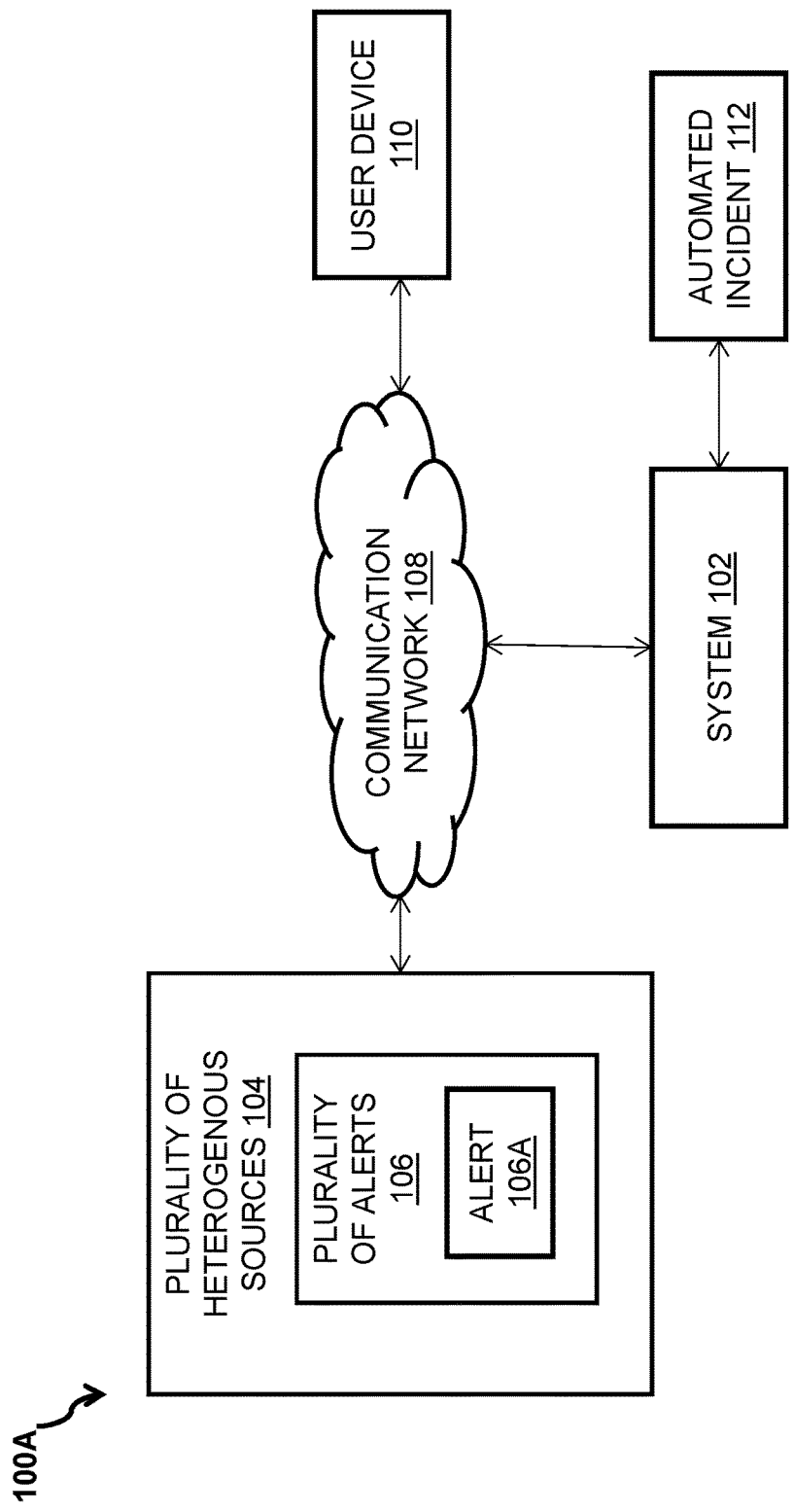
FIG. 1A illustrates a network environment of a system for automated incident generation, in accordance with an example embodiment.

FIG. 1A illustrates a network environment 100A of a system 102 for automated incident generation, in accordance with an example embodiment. The system 102 may be communicatively coupled to a plurality of heterogeneous sources 104, and a user device 110 via a communication network 108. The system 102 may be communicatively coupled to the plurality of heterogeneous sources 104 to receive a plurality of alerts 106 from the plurality of heterogeneous sources 104. The system 102 further retrieves an alert 106A of the plurality of alerts 106.

The components described in the interactive computing environment 100 may be further broken down into more than one component such as an application in the system 102, one or more databases and/or combined together in any suitable arrangement. Further, it is possible that one or more components may be rearranged, changed, added, and/or removed without deviating from the scope of the present disclosure. In an example embodiment, the system 102 may be embodied in one or more of several ways as per the required implementation. For example, the system 102 may be embodied as a cloud-based service, a cloud-based application, a remote server-based service, a remote server-based application, a virtual computing system, a remote server platform or a cloud-based platform. As such, the system 102 may be configured to operate outside the user device 110. However, in some example embodiments, the system 102 may be embodied within the user device 110, for example as an application in a mobile device and the like. In each of such embodiments, the system 102 may be communicatively coupled to the components shown in FIG. 1A to carry out the desired operations and wherever required modifications may be possible within the scope of the present disclosure. The system 102 may be implemented in enterprises or security industries to clarify overall security posture and to combat alert fatigue. Further, in one embodiment, the system 102 may be a standalone unit configured to generate an automated incident 112.

The alert 106A may correspond to a notification or a warning that may be retrieved by the system 102. The alert 106A may be associated with a malicious activity for example, the security breach associated with cybersecurity. The alert 106A may indicate that the security breach may have taken place that may be threatening for security of an entity (such as an organization or an enterprise). In some embodiments, the alert 106A may be categorized as a low-risk alert, a medium risk alert or a high-risk alert. By way of example, a low-risk alert may correspond to instances such as detection of low-risk viruses. A medium-risk alert may correspond to instances for example, identification of exploitation of a critical vulnerability that may have a potential for significant damage to security of the entity. A high-risk alert may correspond to instances for example, complete network failure of the entity.

In order to reduce or eliminate the alert fatigue for the user, the system 102 may generate an automated incident 112. The system 102 may correlate one or more alerts (including the alert 106A) of the plurality of alerts 106 to generate the automated incident 112 corresponding to the one or more alerts. The automated incident 112 may further include analyzed information of the one or more alerts. For example, the automated incident 112 may include a description of the one or more alerts and a timeline of the reception of the one or more alerts.

Furthermore, the automated incident 112 may correspond to an event of a cyber-attack. The event of the cyber-attack includes but may not be limited to packet sniffer, phishing, and rootkit. In general, packet sniffer is an event of the cyber-attack in which a passive receiver records a copy of every packet. By placing the passive receiver in the vicinity of the wireless transmitter, the passive receiver may obtain a copy of every packet that is transmitted. These packets include various types of sensitive information, including passwords, social security numbers, trade secrets, and private personal messages. Further, phishing generally refers to a fraudulent practice of sending emails or text messages purporting to be from reputable companies in order to induce individuals to reveal personal data, such as passwords and credit and/or debit card numbers. In addition, rootkit is a dangerous malware that is designed to benefit administrative rights and get the right of entry to a community tool. Once installed, attackers have completed an unrestricted right of entry to the tool and can, therefore, execute any movement including spying on customers or stealing exclusive data with no hindrance. The automated incident 112 may be utilized by the user to analyze the one or more alerts effectively, thereby, reducing the alert fatigue for the user. The automated incident 112 is not limited to the above-mentioned events. Details of the generation of the automated incident 112 are further provided, for example, in FIGS. 2A, 2B, 2C, 2D and 2E.

In some example embodiments, the user device 110 may be any user accessible device such as a mobile phone, a smartphone, a portable computer, and the like. In some example embodiments, the user device 110 may be associated, coupled, or otherwise integrated with the system 102 to facilitate generation of the automated incident 112. The user device 110 may be used by a user associated with the system 102. The user is any person or group of persons that operates the system 102. The user may correspond to security analyst, administrator, and the like. In one embodiment, the user device 110 may be directly coupled to the system 102 via the communication network 108. For example, the user device 110 may be used by the user to view the automated incident 112. In some example embodiments, the user device 110 may serve the dual purpose of a data gatherer and a beneficiary device.

The communication network 108 may be wired, wireless, or any combination of wired and wireless communication networks, such as cellular, Wi-Fi, internet, local area networks, or the like. In one embodiment, the communication network 108 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In an embodiment the communication network 108 is coupled directly or indirectly to the user device 110. In an example embodiment, the system 102 may be integrated in the user device 110 via the communication network 108.

Figure 1B:
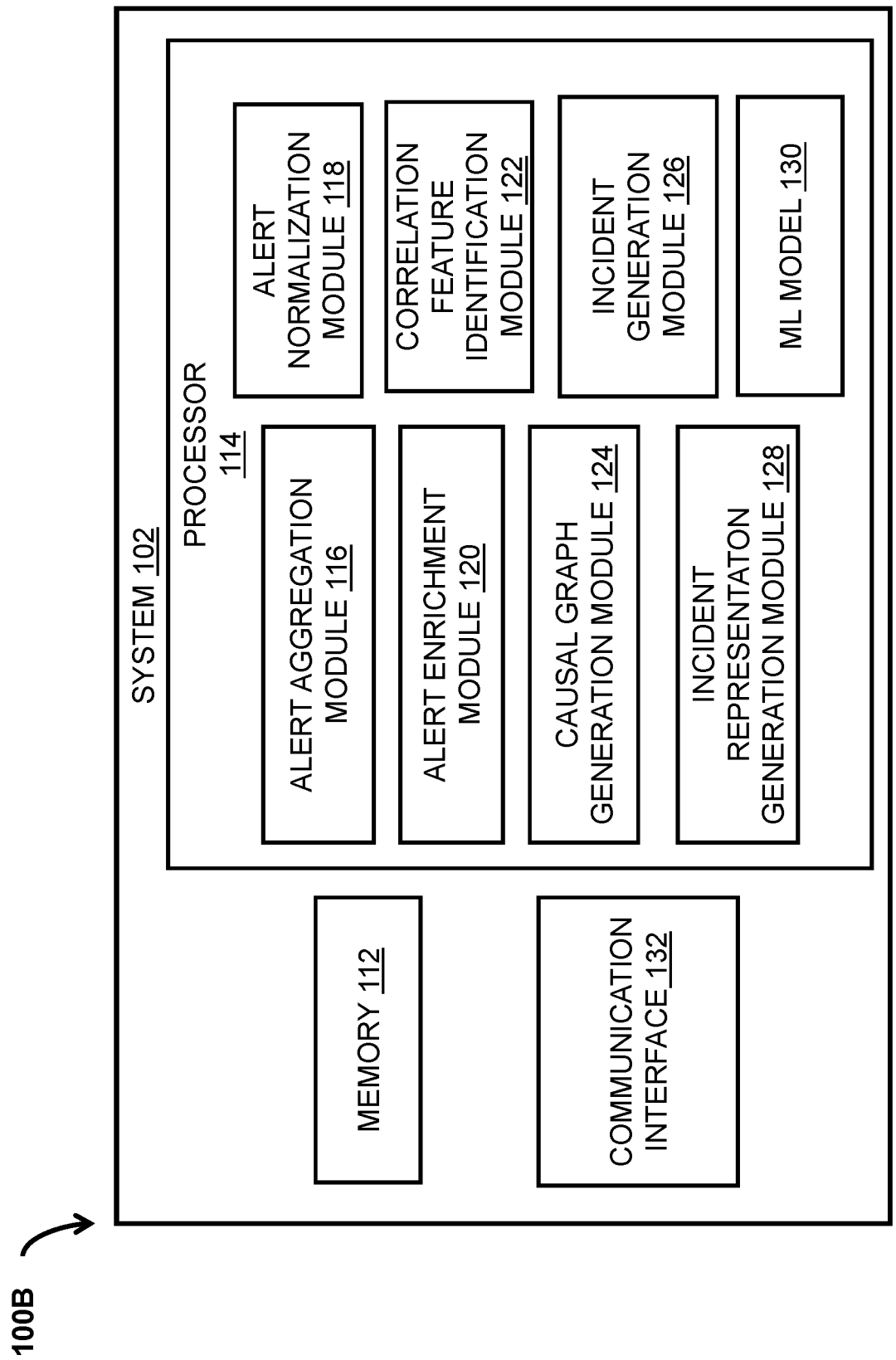
FIG. 1B illustrates a block diagram of the system for automated incident generation, in accordance with an example embodiment.

FIG. 1B illustrates a block diagram 100B of the system 102 for automated incident generation, in accordance with an example embodiment. The system 102 includes at least one memory 112 (hereinafter, also referred to as "memory 112"), at least one processor 114 (hereinafter, also referred to as "processor 114"), and a communication interface 132.

The processor 114 may include an alert aggregation module 116, an alert normalization module 118, an alert enrichment module 120, a correlation feature identification module 122, a causal graph generation module 124, an incident generation module 126, an incident representation generation module 128, and a machine learning model 130 (hereinafter, also referred to as "an ML model 130"). The processor 114 may retrieve computer executable instructions that may be stored in the memory 112 for execution of the computer executable instructions.

The processor 114 may be embodied in a number of different ways. For example, the processor 114 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 114 may include one or more processing cores configured to perform tasks independently. A multi-core processor may enable multiprocessing within a single physical package. Additionally, or alternatively, the processor 114 may include one or more processors configured in tandem via a bus to enable independent execution of instructions, pipelining and/or multithreading.

In some embodiments, the processor 114 may be configured to provide Internet-of-Things (IoT) related capabilities to the user associated with the system 102. In some embodiments, the user may be or correspond to security analysts (as explained above). The security analysts manage the plurality of alerts 106 received by the plurality of heterogeneous sources 104. The IoT related capabilities may in turn be used to facilitate smart investigation tasks. The system 102 may be accessed using the communication interface 132. The communication interface 132 may provide an interface for accessing various features and data stored in the system 102.

Additionally, or alternatively, the processor 114 may include one or more processors capable of processing large volumes of workloads and operations to provide support for big data analysis. In an example embodiment, the processor 114 may be in communication with the memory 112 via a bus for passing information among components coupled to the system 102.

The memory 112 may be non-transitory and may include, for example, one or more volatile and/or non-volatile memories. In other words, for example, the memory 112 may be an electronic storage device (for example, a computer readable storage medium) comprising gates configured to store data (for example, bits) that may be retrievable by a machine (for example, a computing device like the processor 114). The memory 112 may be configured to store information, data, content, applications, instructions, or the like, for enabling the apparatus to carry out various functions in accordance with an example embodiment of the present invention. For example, the memory 112 may be configured to buffer input data for processing by the processor 201.

As exemplarily illustrated in FIG. 1A, the memory 112 may be configured to store instructions for execution by the processor 114. As such, whether configured by hardware or software methods, or by a combination thereof, the processor 114 may represent an entity (for example, physically embodied in circuitry) capable of performing operations according to an embodiment of the present invention while configured accordingly. Thus, for example, when the processor 114 is embodied as an ASIC, FPGA or the like, the processor 114 may be specifically configured hardware for conducting the operations described herein. Alternatively, as another example, when the processor 114 is embodied as an executor of software instructions, the instructions may specifically configure the processor 114 to perform the algorithms and/or operations described herein when the instructions are executed. However, in some cases, the processor 114 may be a processor specific device (for example, a mobile terminal or a fixed computing device) configured to employ an embodiment of the present invention by further configuration of the processor 114 by instructions for performing the algorithms and/or operations described herein. The processor 114 may include, among other things, a clock, an arithmetic logic unit (ALU) and logic gates configured to support operation of the processor 114.

The processor 114 may be configured to retrieve alert 106A of the plurality of alerts 106 from the plurality of heterogeneous sources 104 with facilitation of the alert aggregation module 116. The alert aggregation module 116 may be configured to aggregate the plurality of alerts 106 from the plurality of heterogeneous sources 104 together. The plurality of heterogeneous sources 104 includes but may not be limited to firewall, endpoint detection and response (EDR) tool, and network detection and response (NDR) tool.

Further, the processor 114 may be configured to perform normalization with facilitation of the alert normalization module 118. The alert normalization module 118 normalizes each alert of the aggregated plurality of alerts 106. Normalization generally refers to a process of organizing the data in appropriate categories. The alert normalization module 118 may be configured to identify a first pre-defined rule associated with, for example, a field of the retrieved alert 106A. In one embodiment, the alert normalization module 118 may be configured to normalize the retrieved alert 106A based on the identified first pre-defined rule. The field of the retrieved alert 106A may be associated with at least one of: a field name or a field value type of the retrieved alert 106A. In an alternate embodiment, the alert normalization module 118 may be configured to apply the ML model 130 on the retrieved alert 106A, based on unsuccessful identification of the first pre-defined rule, to output the normalized alert. The first pre-defined rule will be further explained in FIG. 2A. Further, the ML model 130 may be trained to normalize the retrieved alert 106A based on semantic similarity parameters associated with the field of the retrieved alert 106A. The alert normalization module 118 may be configured to utilize the ML model 130 to normalize similar field names into a unified field name. The alert normalization module 118 outputs a normalized alert. The alert normalization module 118 will be further explained in detail in FIG. 2A, which elaborates how the ML model utilizes semantic similarity parameter to normalize the retrieved alert 106A.

Furthermore, the processor 114 may be configured to perform enrichment of each of the normalized alert using the alert enrichment module 120. Enrichment is based on security related data of the security breach associated with the generated normalized alert. The alert enrichment module 120 takes as input the normalized alert and outputs an enriched alert. The alert enrichment module 120 identifies a second pre-defined rule associated with the security related data of the security breach associated with the normalized alert (further explained in FIG. 2B). The alert enrichment module 120 may be configured to apply the ML model 130 on the normalized alert to enrich the normalized alert with the security related data, based on unsuccessful identification of the second pre-defined rule. The alert enrichment module 120 is further explained in detail in FIG. 2B.

The processor may be further configured to identify a set of correlation features associated with the generated enriched alert with facilitation of the correlation feature identification module 122. The correlation feature identification module 122 may utilize at least one of a set of built-in features or a clustering model to identify the set of correlation features associated with the generated enriched alert. The correlation feature identification module 122 will be further explained in detail in FIG. 2C.

In an embodiment, the processor 114 may be further configured to generate a causal graph with facilitation of the causal graph generation module 124. The causal graph generation module 124 utilizes the generated enriched alert and the identified set of correlation features to generate the causal graph. The causal graph comprises one or more nodes and one or more edges. Each node of the one or more nodes represents a correlation feature of the identified set of correlation features, and each edge of the one or more edges represents a relationship between corresponding correlation features represented by corresponding nodes of the one or more nodes. (further explained in FIG. 2D). In an embodiment, the causal graph generation module 124 may generate a set of causal graphs when there are multiple enriched alerts. Further, the causal graphs may be utilized by the incident generation module 126 for generating automated incident 112. The incident generation module 126 will be further explained in detail FIG. 2E. The processor 114 may be configured to perform stream processing in real time by processing the plurality of alerts 106 and create or update a plurality of automated incidents in a stream paradigm.

In an embodiment, the incident representation generation module 128 may be configured to utilize the automated incident 112 for representation of the automated incident 112. The automated incident 112 is associated with the alert based on at least the generated enriched alert and the identified set of correlation features associated with the enriched alert. (Further explained in FIG. 2F).

With reference still to FIG. 1B, the system 102 includes the communication interface 132. The communication interface 132 may comprise input interface and output interface for supporting communications to and from the system 102 or any other component with which the system 102 may communicate. The communication interface 132 may be any means such as a device or circuitry embodied in either hardware or a combination of hardware and software that is configured to receive and/or transmit data to/from a communications device in communication with the user device 110. In this regard, the communication interface 132 may include, for example, an antenna (or multiple antennae) and supporting hardware and/or software for enabling communications with a wireless communication network. Additionally, or alternatively, the communication interface 132 may include the circuitry for interacting with the antenna(s) to cause transmission of signals via the antenna(s) or to handle receipt of signals received via the antenna(s). In some environments, the communication interface 132 may alternatively or additionally support wired communication. As such, for example, the communication interface 132 may include a communication modem and/or other hardware and/or software for supporting communication via cable, digital subscriber line (DSL), universal serial bus (USB) or other mechanisms for enabling the system 102 to carry out information exchange functions in many different forms of communication environments. The communication interface 132 enables exchange of information and instructions for generation of the automated incident 112.

Figure 2A:
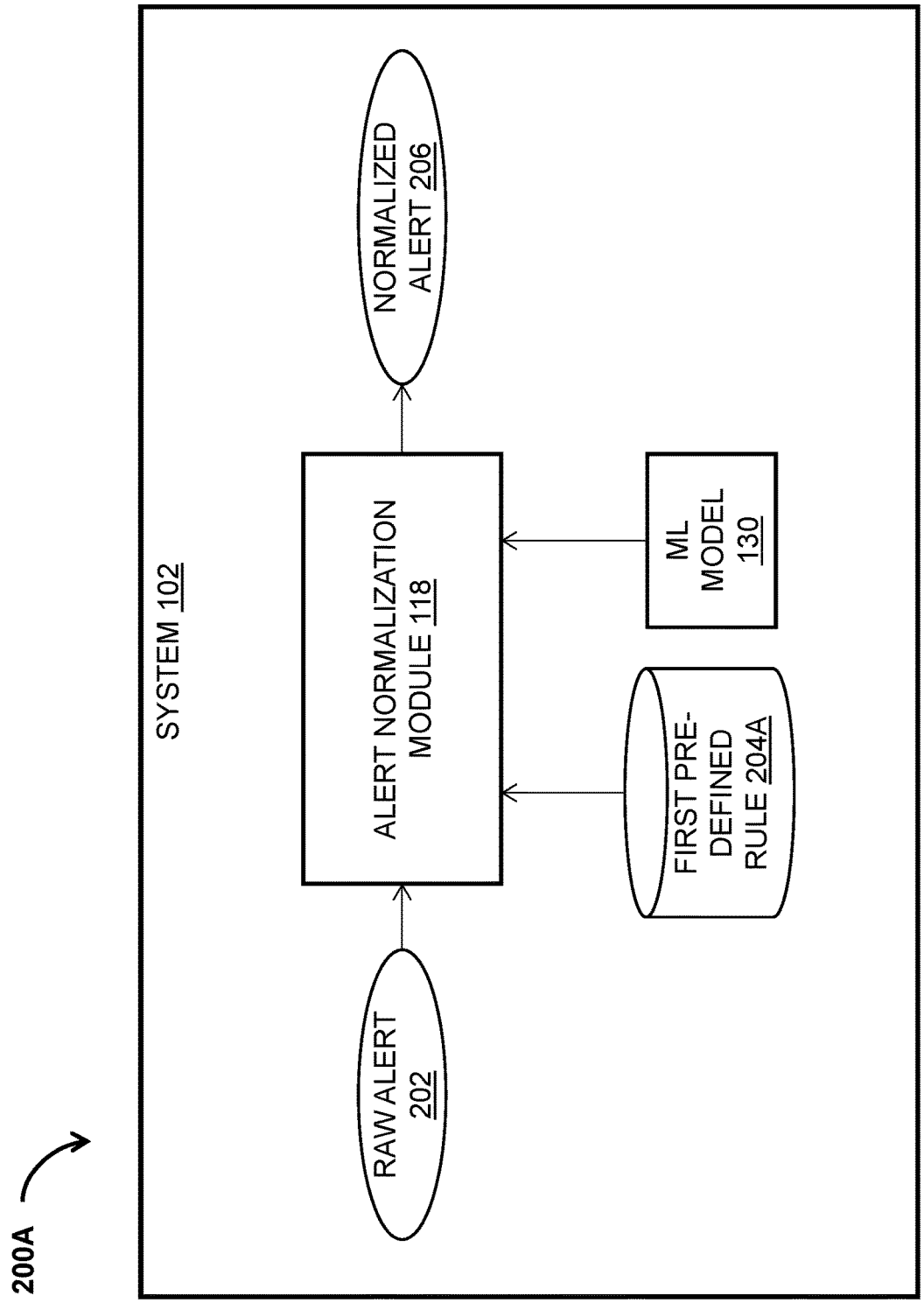
FIG. 2A illustrates a block diagram depicting generation of a normalized alert, in accordance with an example embodiment.

FIG. 2A illustrates a block diagram 200A depicting generation of a normalized alert 206, in accordance with an example embodiment. The normalized alert 206 may be generated using the alert normalization module 118. The alert normalization module 118 may take as input a raw alert 202. In an embodiment, the raw alert 202 is aggregated using the alert aggregation module 116 (as explained in FIG. 1B). The raw alert 202 may correspond to the alert 106A of the plurality of alerts 106 as explained above in FIG. 1A. In an embodiment, the input to the alert normalization module 118 may be multiple alerts of the plurality of alerts 106. The alert normalization module 118 may be configured to identify a first pre-defined rule 204A to normalize the raw alert 202 (hereinafter, the retrieved alert 202). The first pre-defined rule 204A corresponds to the first pre-defined rule mentioned above in FIG. 1B. The first-pre-defined rule 204A may be identified from past set of data, third party databases, and the like. The first pre-defined rule 204A may be associated with a field of the retrieved alert 202. The first pre-defined rule 204A may correspond to one or more rules used for normalizing the retrieved alert 106A. The first predefined rule may be based on the semantic similarity parameter associated with the field of the retrieved alert 202. The field of the retrieved alert 202 may be associated with at least one of a field name or a field value type of the retrieved alert. In one embodiment, the alert normalization module 118 may be configured to normalize the retrieved alert 202 based on the identified first pre-defined rule 204A.

In an alternate embodiment, the alert normalization module 118 may be configured to apply the ML model 130 to normalize the retrieved alert if identification of the first pre-defined rule 204A becomes unsuccessful. The ML model 130 may be applied to the retrieved alert 202, based on unsuccessful identification of the first pre-defined rule 204A, to output a normalized alert 206. The ML model 130 may be trained to normalize the retrieved alert 202 based on the semantic similarity parameter associated with the field of the retrieved alert 202. For example, for a user involved in an alert, different data sources may use different field names, such as "username", "user_name", "user name" and the like. The alert normalization module 118 may normalize all these field names into a unified field name "User.name". The alert normalization module 118 may utilize the ML model 130 to normalize similar field names into the unified field name. The ML model 130 may use natural language processing (NLP) techniques to identify the semantic similarity parameter of the field names. The NLP techniques include but may not be limited to named entity recognition, text summarization, and aspect mining. In general, named entity recognition is used to extract entities in a text. For example, an entity can be any word or series of words that consistently refers to the same thing. Every detected entity is classified into a predetermined category. Named entity recognition identifies entities such as people, locations, organizations, dates, etc. from the text. For example, the named entity recognition might detect the word "super.IoT" in a text and classify it as an "organization". In addition, named entity recognition highlights fundamental concepts and references in the text. In general, text summarization helps summarize large chunks of text. In an example, if an alert contains a number of words in text, text summarization identifies context and creates a summary to identify the semantic similarity parameter. In general, aspect mining identifies different aspects in a text to identify the semantic similarity parameter. The alert normalization module 118 outputs the normalized alert 206. The normalized alert 206 is utilized by the alert enrichment module 120 as explained in FIG. 2B.

Figure 2B:
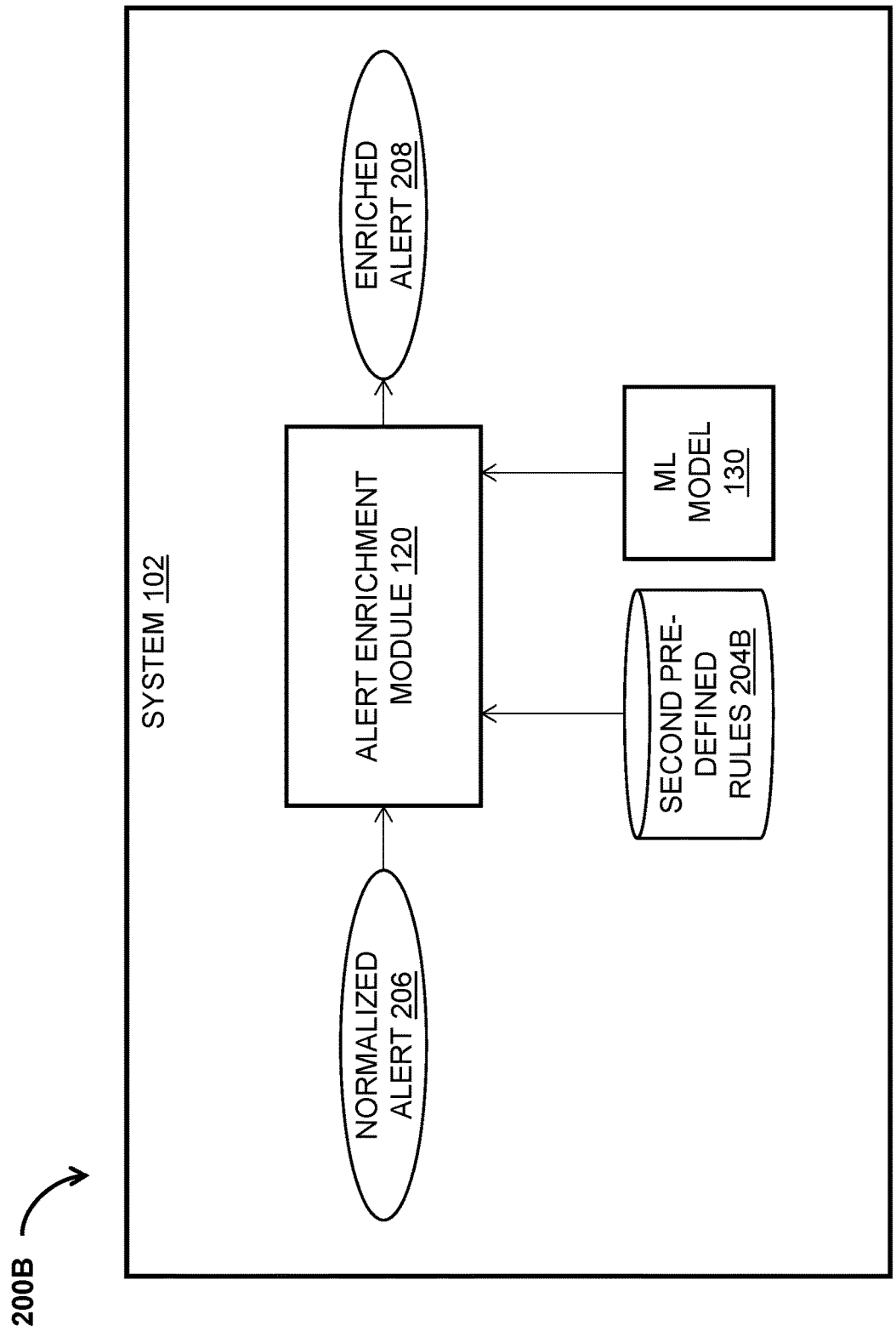
FIG. 2B illustrates a block diagram depicting generation of an enriched alert, in accordance with an example embodiment.

FIG. 2B illustrates a block diagram 200B of the system 102 depicting generation of an enriched alert 208, in accordance with an example embodiment. The enriched alert 208 is generated using alert enrichment module 120. The alert enrichment module 120 takes as input the normalized alert 206. The alert enrichment module 120 performs enrichment of the normalized alert 206 to generate an enriched alert 208. The enrichment is based on the security related data of the security breach associated with the generated normalized alert.

The alert enrichment module 120 identifies a second pre-defined rule 204B associated with the security related data of the security breach associated with the normalized alert 206. The security related data corresponds to at least one of: a tactic of the security breach, a technique of the security breach, a kill chain stage of the security breach, or a scope of the security breach. The tactic of the security breach corresponds to a detected tactic of an attacker in the normalized alert 206. The technique of the security breach corresponds to a technique used by an attacker in the normalized alert 206. In general, kill chain corresponds to a step by step approach of an attack. The kill chain stage corresponds to a stage or step at which the attacker breaches the security. In addition, the scope of the security breach identifies whether the attack when the alert was raised is external or internal. The alert enrichment module 120 enriches the normalized alert 206 based on the identified second predefined rule.

In one embodiment, the alert enrichment module 120 may be configured to enrich the normalized alert 206 based on the identified second pre-defined rule 204B. In an alternate embodiment, the alert enrichment module 120 may be configured to apply the ML model 130 on the normalized alert 206 to enrich the normalized alert 206 with the security related data, based on unsuccessful identification of the second pre-defined rule 204B.

The ML model 130 may be applied on the normalized alert 206 to output the enriched alert 208. For example, based on an Internet Protocol (IP) address of the hosts involved in an alert, scope of the alert can be identified. In general, an IP address is a unique identifying number assigned to every single device that uses the Internet. The IP address identifies the host, or more specifically its network interface, and provides the location of the host in the network, and thus the capability of establishing a path to that host. The output of the alert enrichment module 120 is the enriched alert 208. The enriched alert 208 is further utilized by the correlation feature finding module 122 as explained in detail in FIG. 2C.

Figure 2C:
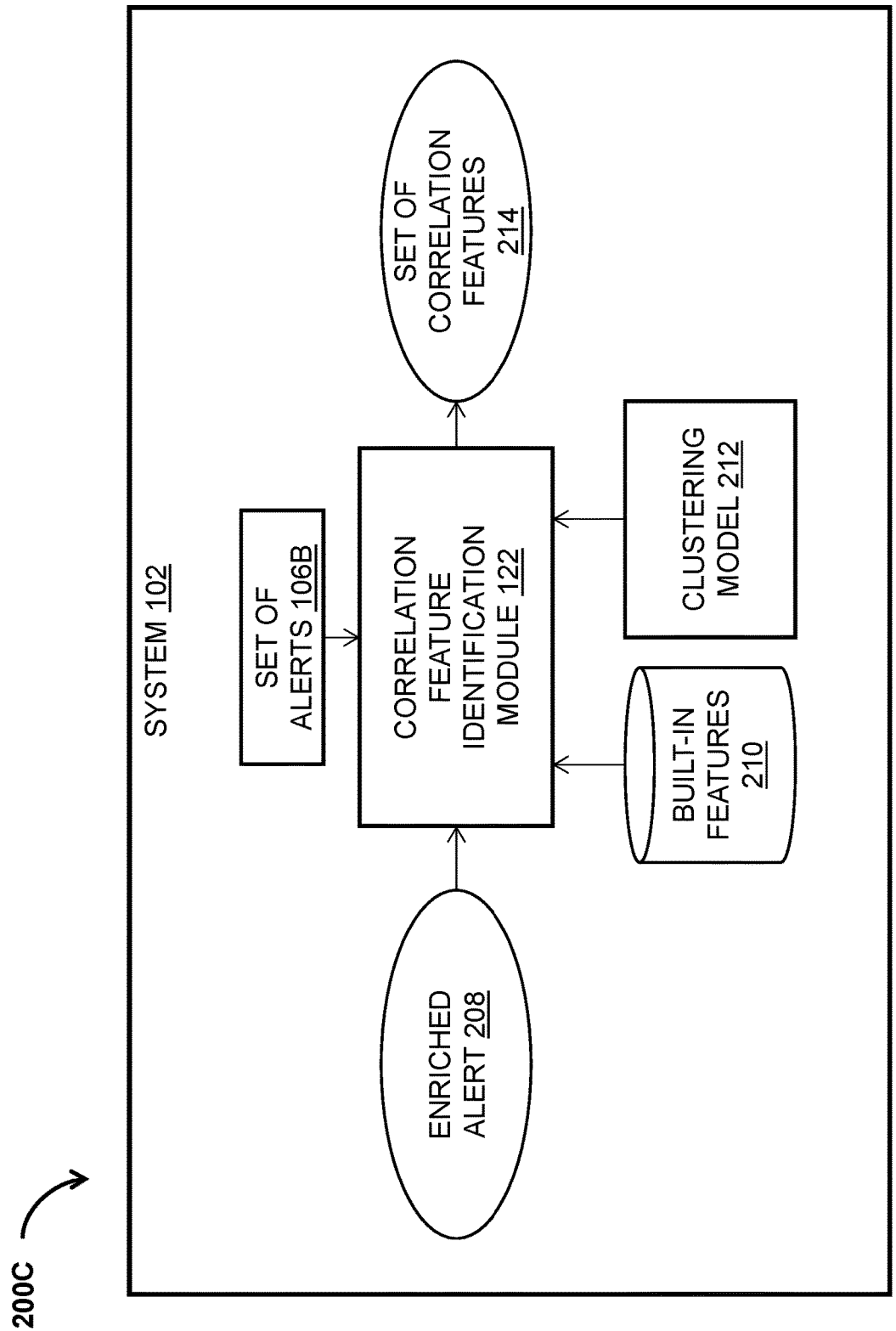
FIG. 2C illustrates a block diagram depicting identification of a set of correlation features, in accordance with an example embodiment.

FIG. 2C illustrates a block diagram 200C of the system 102 depicting identification of a set of correlation features, in accordance with an example embodiment. The set of correlation features may be identified using the correlation feature identification module 122. The correlation feature identification module 122 may be configured to receive a set of alerts 106B as input. The set of alerts 106B corresponds to recent alerts of the plurality of alerts 106 received from the plurality of heterogeneous sources 104. The set of alerts 106B are received from the plurality of heterogeneous sources 104 as explained in FIG. 1A.

In addition, the correlation feature identification module 122 may take as input the enriched alert 208. Further, the correlation feature identification module 122 may utilize at least one of a set of built-in features 210 (hereinafter, also referred to as built-in features 210) or a clustering model 212 to identify observables and a set of correlation features 214 associated with the generated enriched alert 208 and the received set of alerts of the plurality of alerts 106. In one embodiment, the clustering model 212 may correspond to the ML model 130 of FIG. 1B. In another embodiment, the clustering model may be a part of the ML model 130. The clustering model 212 may be trained on the set of alerts 106B to identify the set of correlation features 214 associated with the generated enriched alert 208 and the received set of alerts 106B. The enriched alert 208 is added to the set of alerts 106B of the plurality of alerts 106 to update the clustering model 212.

The built-in features 210 may comprise at least one of information of a user or an attacker associated with the security breach, an asset associated with the security breach, an external host associated with the security breach, a process associated with the security breach, a type of file associated with the security breach, or a registry associated with the security breach of the enriched alert 208. In general, a security breach is any incident that results in unauthorized access to computer data, applications, networks or devices. It results in information being accessed without authorization. In an example, information of a user or an attacker associated with the security breach may include user name or identification of the user. In addition, the asset associated with the security breach corresponds to the asset that the user wants to access such as a paper document, a digital document, a database, a password or encryption key or any other digital file. Further, the process associated with the security breach corresponds to a type of security breach technique used by the attacker. The correlation feature identification module 122 may output the set of correlation features 214. In addition, the observables and the set of correlation features comprises at least one of: an internet protocol (IP) geo location associated with the security breach of the enriched alert 208, sensor identification (ID) associated with the security breach of the enriched alert 208, or a device ID associated with the security breach of the enriched alert 208. In general, IP geo location is mapping of an IP address or MAC address to real-world geographic location of an Internet-connected computing or a mobile device. In addition, geo location involves in mapping IP address to the country, region (city), latitude/longitude, Internet Service Provider and domain name among other useful things. In general, device ID is a string of numbers and letters that identifies every individual communication device in the world. It is stored on the mobile device and can be retrieved by any application that is downloaded and installed in the communication device. Based on the identified observables and the set of correlation features 214, the processor 114 may be further configured to generate a casual graph using the causal graph generation module 124 as explained further in FIG. 2D.

Figure 2D:
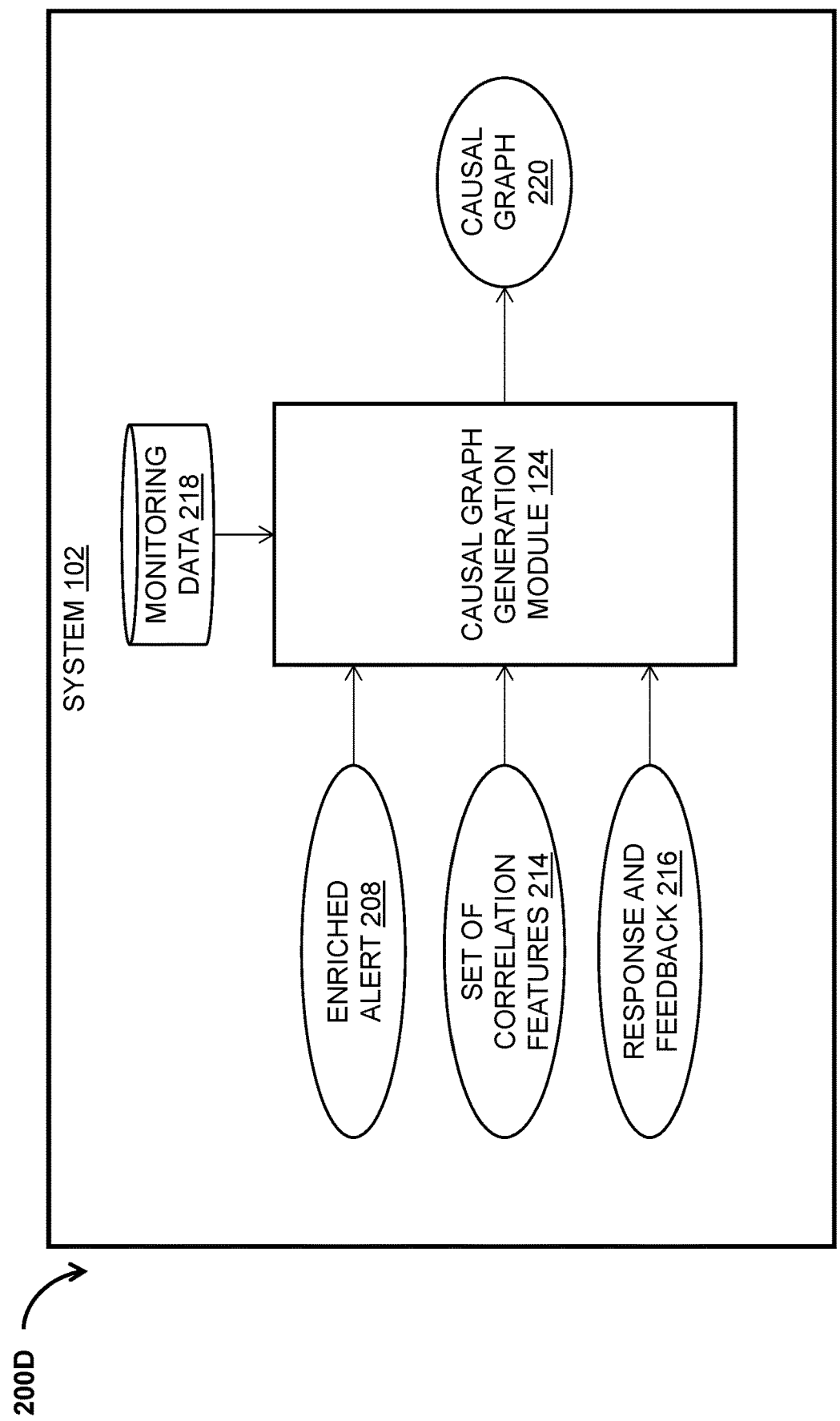
FIG. 2D illustrates a block diagram depicting generation of a causal graph, in accordance with an example embodiment.

FIG. 2D illustrates a block diagram 200D of the system 102 depicting generation of a causal graph 220, in accordance with an example embodiment. The causal graph generation module 124 takes as input the enriched alert 208 along with the set of correlation features 214. In addition, the causal graph generation module 124 may utilize at least one of a response and feedback 216 associated with a user of the system 102, or monitoring data 218 associated with the system 102 to generate the causal graph 220.

The causal graph generation module 124 may be configured to generate the causal graph 220 based on the generated enriched alert 208 and the identified set of correlation features 214 along with at least one of the response and feedback 216 and the monitoring data 218. The response and feedback 216 is associated with the user of the system 102 such as security analyst. In addition, the monitoring data 218 corresponds to information associated with the set of alerts 106B that is monitored by the user of the system 102. In an example, the response and feedback 216 may correspond to the user's approach to manage the set of alerts 106B. The causal graph 220 comprises one or more nodes and one or more edges. Each node of the one or more nodes represents a correlation feature of the identified set of correlation features 214, and each edge of the one or more edges represents a relationship between corresponding correlation features represented by corresponding nodes of the one or more nodes. Each node of the one or more nodes and each edge of the one or more edges may have attributes. The causal graph generation module 124 creates the one or more nodes using the identified set of correlation features 214 and the monitoring data 218. Further, the one or more edges are created using the relationship identified in the monitoring data 218. For example, a process P1 creates another process P2. The causal graph generation module 124 may create two nodes (P1 and P2) and an edge with label "creation" between the two nodes P1 and P2. After the nodes and edges are created, the enriched alerts are added as edge attributes to the corresponding edges. Further, the response and feedback 216 of the user are added as either node attributes or edge attributes. In the end, each connected graph is the causal graph 220. In an embodiment, the causal graph generation module 124 may generate a set of causal graphs when the system 102 has a set of enriched alerts. The causal graph 120 is an output of the causal graph generation module 124. The causal graph 220 is further utilized by the incident generation module 126 to generate the automated incident 112 as explained further in FIG. 2E.

Figure 2E:
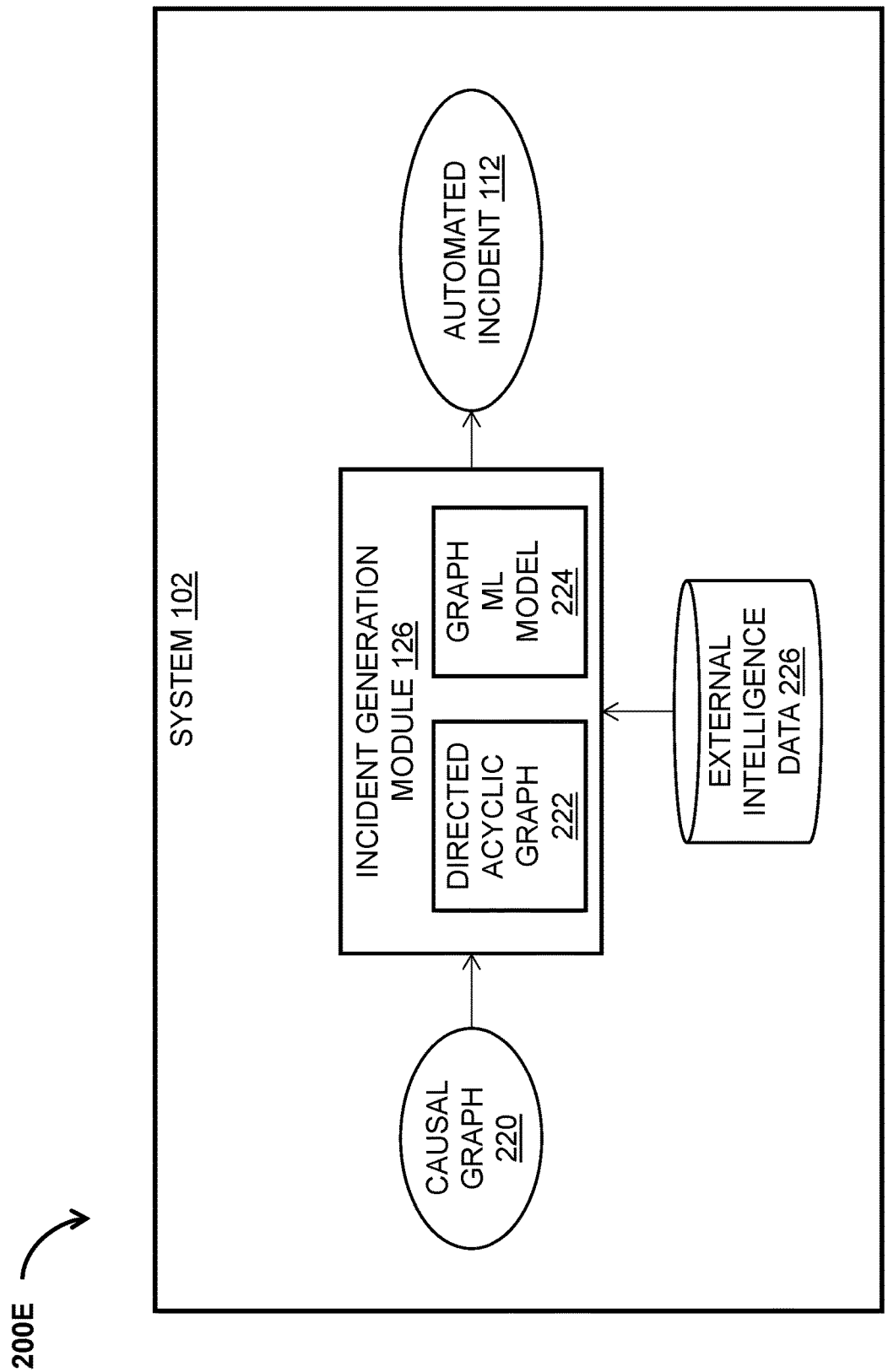
FIG. 2E illustrates a block diagram depicting generation of an automated incident, in accordance with an example embodiment.

FIG. 2E illustrates a block diagram 200E of the system 102 depicting generation of the automated incident 112, in accordance with an example embodiment. The automated incident 112 is generated with facilitation of the incident generation module 126. The incident generation module 126 takes as input the causal graph 220. The incident generation module 126 may be configured to perform graph transformation. The incident generation module 126 transforms the generated causal graph 220 to a directed acyclic graph 222. The transformed causal graph or the directed acyclic graph 222 is passed to a graph ML model 224. The graph ML model 224 may assign a new label for each node in the directed acyclic graph 222 based on external intelligence data 226. The external intelligence data 226 includes but not limited to graph topology, node and edge attributes, temporal information, and attack patterns. Node and edge attributes may correspond to attributes of the one or more nodes and the one or more edges of FIG. 2D. Nodes with the same assigned label are formed into a new graph. The alerts associated with the edges on this new graph are correlated to the final automated incident 112.

The incident generation module 126 may generate the automated incident 112 associated with the alert based on application of the graph ML model 224 using the generated causal graph 220 and the external intelligence data 226 associated with the security breach. The graph ML model 224 may be trained to utilize the transformed directed acyclic graph 222. The graph ML model 224 may be the ML model 130 of FIG. 1B. In an embodiment, the graph ML model 224 is a part of the ML model 130.

The incident generation module 126 may take into consideration past alerts and incidents history, the response and feedback of the user associated with the system 102, and the external intelligence data 226 to train and update the graph ML model 224 by updating incident creation algorithms dynamically. The graph ML model 224 is a set of ML algorithms which learn topological relationships on graphs, in other words, how a node or edge affects other nodes and edges, or the sub-graph as a whole. The incident generation module 126 may give as an output the automated incident 112. The automated incident 112 may correspond to an event of a cyber-attack. The event of the cyber-attack includes but may not be limited to packet sniffer, phishing, and rootkit (as explained in FIG. 1A). The automated incident 112 is further utilized by the incident representation generation module 128 as explained in FIG. 2F. The system 102 may be configured to utilize these incidents to provide the best incident presentations (explained in FIG. 2F) to help the security analysts to understand the context of attacks. The different incident presentations may help the security analysts in attack comprehension and investigation. The system 102. In addition, such systems (the system 102) may be configured to reveal advanced persistent threats and clarify the overall security posture of an organization.

Figure 2F:
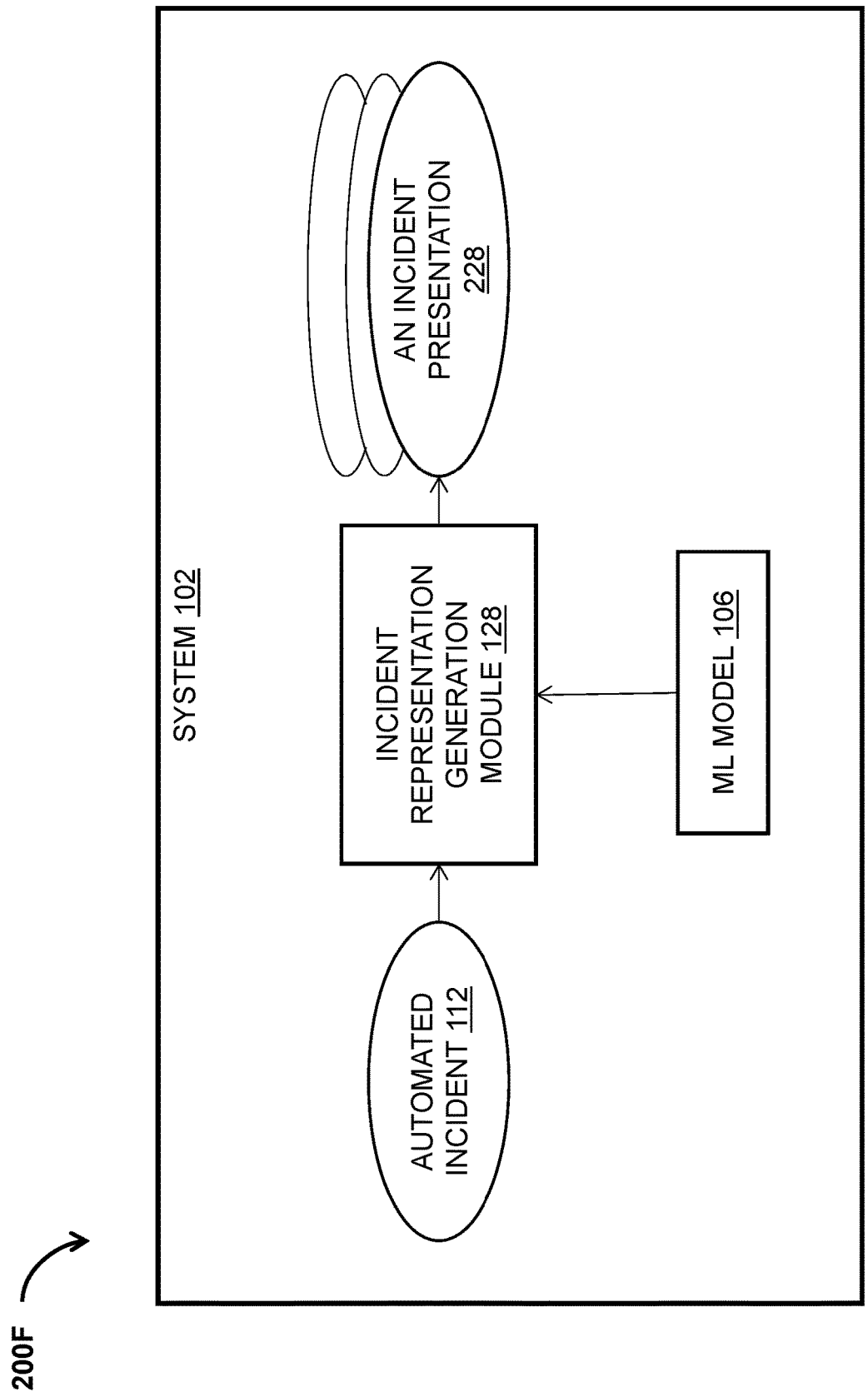
FIG. 2F illustrates a block diagram depicting generation of an incident presentation, in accordance with an example embodiment.

FIG. 2F illustrates a block diagram 200F of the system 102 depicting generation of an incident presentation 228 using the incident representation generation module 128, in accordance with an example embodiment. The incident representation generation module 128 may be configured to generate the incident presentation 228 based on application of the ML model 130 of the generated automated incident 112 associated with the alert. The ML model 130 is based on a natural language processing technique (as explained above in FIG. 2A). The incident representation generation module 128 may take as input the automated incident 112 and apply the ML model 130 on the automated incident 112 to generate the incident presentation 228. The generated incident presentation 228 may be sent to the user device 110 to help the user (such as security analysts as explained before) associated with the system 102 understand context of attacks.

The generated incident presentation 228 may correspond to at least one of a contextualized alert description, an event summarization associated with the security breach, a tactical graph associated with the security breach, an incident timeline and summary, or an incident graph associated with the generated automated incident 112. The contextualized alert description may be utilized by the user quickly understand the alert without digging into raw alert data. For each alert to investigate, the incident representation generation module 128 may generate alert descriptions with contextual information. In addition, for each alert to investigate, the incident representation generation module 128 may calculate the event summarization of low-level events associated with the security breach that raise the alerts. For example, for a brute-force login alert, it gives a summary of IP ranges of the hosts performing the attack. Further, the tactical graph corresponds to a high-level graph that summarizes the attacker's actions in real-time. The user of the system 102 may use this graph to quickly realize scope and magnitude of the attack, thus to take an effective response. Furthermore, the incident timeline and summary may provide a high-level explanation of the attack scenario to the user. Moreover, the incident graph is a detailed graph that contains involved alerts and relevant events for attack investigation.

The incident representation generation module 128 may generate multiple incident presentations. The multiple incident presentations help the user in attack comprehension and investigation.

The system 102 generates the automated incident 112 by performing a step-by-step method as explained in FIG. 3.

FIG. 3 illustrates a flow chart 300 of a method for automated incident generation, in accordance with an example embodiment. It may be noted that each block of the flow diagram 300 of the method is explained in reference with the FIGS. 1A-2F. It will be understood that each block of the flow diagram 300 of the method may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 112 of the system 102, employing an embodiment of the present invention and executed by a processor 114. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow chart 300, and combinations of blocks in the flow diagram 300, may be implemented by special purpose hardware-based computer systems which perform the specified functions, or combinations of special purpose hardware and computer instructions. The method illustrated by the flow chart 300 of FIG. 3 is generating the automated incident 112. Fewer, more, or different steps may be provided.

The method initiates at step 302. Following step 302, at step 304, the method comprises retrieving the alert 106A of the plurality of alerts 106 revived from a plurality of heterogeneous sources 104 (as explained in FIG. 1A). The processor 114 may be configured to aggregate the plurality of alerts 106 from the plurality of heterogeneous sources 104 together using the alert aggregation module 116. The plurality of heterogeneous sources 104 includes but may not be limited to firewall, endpoint detection and response (EDR) tool, and network detection and response (NDR) tool.

At step 306, the method comprises generating the normalized alert 206 based on normalization of the retrieved alert 106A. The normalization is associated with a semantic similarity parameter. The method further comprises identifying the first predefined rule of the pre-defined rules 204 associated with the field of the retrieved alert 106A. The first predefined rule is based on the semantic similarity parameter associated with the field of the retrieved alert 106A. The field of the retrieved alert is associated with at least one of: a field name or a field value type of the retrieved alert (as explained in FIG. 2). Further, the method comprises normalizing the retrieved alert 106A based on the identified first predefined rule. If the first predefined rule is unidentified, the method includes a step of applying the ML model 126 on the retrieved alert 106A. The ML model 126 is trained to normalize the retrieved alert 106A based on the semantic similarity parameter associated with the field of the retrieved alert 106A.

At step 308, the method comprises generating the enriched alert 208 based on enrichment of the generated normalized alert 206. The enrichment is based on security related data of the security breach associated with the generated normalized alert 206. The method further comprises identifying the second predefined rule of the pre-defined rules 204 associated with the security related data of the security breach associated with the normalized alert 206. The security related data corresponds to at least one of: the tactic of the security breach, the technique of the security breach, the kill chain stage of the security breach, or the scope of the security breach as explained in FIG. 2B. The method further comprises enriching the normalized alert 206 based on the identified second predefined rule. If the first predefined rule is unidentified, the method includes a step of applying the ML model 126 on the normalized alert to output the enriched alert 208. The ML model 126 is trained to enrich the normalized alert based on the security related data of the security breach associated with the normalized alert 206.

At step 310, the method comprises identifying the set of correlation features 214 associated with the generated enriched alert 208. The identification of the set of correlation features 214 includes receiving the set of alerts of the plurality of alerts received from the plurality of heterogeneous sources 104 (as explained in FIG. 1A) and utilizing at least one of: the built-in features 210 or a clustering model 212 to identify the set of correlation features 214. The set of correlation features 214 is associated with the generated enriched alert 208 and the received set of alerts. The clustering model 212 is trained on the set of alerts to identify the set of correlation features 214 associated with the generated enriched alert 208 and the received set of alerts.

At step 312, the method comprises generating the automated incident 112 associated with the retrieved alert 106 based on at least the generated enriched alert 208 and the identified set of correlation features 214 associated with the enriched alert 208. The method includes generation of the causal graph 220 based on the generated enriched alert 208 and the identified set of correlation features 214. The causal graph comprises one or more nodes and one or more edges (as explained in FIG. 2D). In addition, the method includes generating the automated incident 112 associated with the alert based on application of the graph ML model using the generated causal graph 220 and the external intelligence data 226 associated with the security breach.

The method further includes generating the automated incident presentation 228 based on application of the ML model of the generated automated incident 112 associated with the retrieved alert 106. The ML model is based on a natural language processing technique (as explained in FIG. 2F). The automated incident presentation 228 is sent to the user device 110 to help the user in attack comprehension and investigation.

The method terminates at step 314.

In conventional systems, alerts are received from one or more homogeneous sources only, that may lead to non-detection of the attack activities from other sources. Moreover, in some scenarios, a large number of the received alerts may lead to the phenomenon known as the alert fatigue. The alert-fatigue may cause the analysis of the alerts challenging for the user, such as the security analyst. Furthermore, a chain of low-level events associated with the alerts received from the one or more homogeneous sources may need to be manually related together to understand the security breach, thereby making the task of analysis of the alerts tedious and even more challenging for the user. On the other hand, the system of the present disclosure enables retrieval of the alerts from the plurality of heterogeneous sources. The retrieval of the alerts from the plurality of heterogeneous sources ensures that the attack activities may be detected from various sources. The system may further utilize the alert normalization and the alert enrichment to correlate the retrieved alerts, such as the alert 106A. In addition, the system 102 may generate the causal graph 220 among different correlation features (for example, objects involved in alerts), associated with the alerts, to understand the causal relationship between the different objects in the correlated alerts, and to understand a strength of the relationship between different objects. Therefore, the system 102 may intelligently decide the correlation of the alerts. The system 102 may further generate the automated incident 112 based on the correlation of the alerts. Thus, the system 102 of the present disclosure enables generation of the automated incident 112 that may provide reduction or elimination of the alert fatigue, thereby, making the analysis of the alerts easy for the user. The system 102 may further work incrementally in real-time, and gradually absorb new alerts into the automated incident 112 to provide the incident presentations that may help the users to understand the context of the automated incident 112. The different incident presentations may further help the users in attack comprehension and investigation. Therefore, the system 102 of the present disclosure enables detection of advanced persistent threats and may help clarify an overall security posture of the entity, such as the enterprise or the organization.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal. The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for automated incident generation, the system comprising:
    at least one non-transitory memory configured to store computer executable instructions; and
    at least one processor configured to execute the computer executable instructions to:
    retrieve an alert of a plurality of alerts received from a plurality of heterogeneous sources, wherein the alert of the plurality of alerts is associated with a security breach;
    generate a normalized alert based on normalization of the retrieved alert, wherein the normalization is associated with a semantic similarity parameter;
    generate an enriched alert based on enrichment of the generated normalized alert, wherein the enrichment is based on security related data of the security breach associated with the generated normalized alert;
    identify a set of correlation features associated with the generated enriched alert; and
    generate the automated incident associated with the alert based on at least the generated enriched alert and the identified set of correlation features associated with the enriched alert.

2. The system of claim 1, wherein for normalization of the retrieved alert, the at least one processor is further configured to:
    identify a first predefined rule associated with a field of the retrieved alert, wherein the first predefined rule is based on the semantic similarity parameter associated with the field of the retrieved alert, and wherein the field of the retrieved alert is associated with at least one of: a field name or a field value type of the retrieved alert; and
    normalize the retrieved alert based on the identified first predefined rule.

3. The system of claim 2, wherein for normalization of the retrieved alert, the at least one processor is further configured to:
    apply a machine learning (ML) model on the retrieved alert, based on unsuccessful identification of the first predefined rule, to output the normalized alert,
    wherein the ML model is trained to normalize the retrieved alert based on the semantic similarity parameter associated with the field of the retrieved alert.

4. The system of claim 2, wherein for enrichment of the normalized alert, the at least one processor is further configured to:
    identify a second predefined rule associated with the security related data of the security breach associated with the normalized alert, wherein the security related data corresponds to at least one of: a tactic of the security breach, a technique of the security breach, a kill chain stage of the security breach, or a scope of the security breach; and
    enrich the normalized alert based on the identified second predefined rule.

5. The system of claim 4, wherein for the enrichment of the normalized alert, the at least one processor is further configured to:
    apply an ML model on the normalized alert, based on unsuccessful identification of the second predefined rule, to output the enriched alert,
    wherein the ML model is trained to enrich the normalized alert based on the security related data of the security breach associated with the normalized alert.

6. The system of claim 1, wherein to identify the set of correlation features, the at least one processor is further configured to:
    receive a set of alerts of the plurality of alerts received from the plurality of heterogeneous sources; and
    utilize at least one of: a set of built-in features or a clustering model to identify the set of correlation features associated with the generated enriched alert and the received set of alerts, wherein the clustering model is trained on the set of alerts to identify the set of correlation features associated with the generated enriched alert and the received set of alerts.

7. The system of claim 6, wherein the set of built-in features comprises at least one of: information of a user associated with the security breach, an asset associated with the security breach, an external host associated with the security breach a process associated with the security breach, a type of file associated with the security breach, or a registry associated with the security breach of the enriched alert.

8. The system of claim 1, wherein the set of correlation features comprises at least one of: an internet protocol geo location associated with the security breach of the enriched alert, a sensor identification (ID) associated with the security breach of the enriched alert, or a device ID associated with the security breach of the enriched alert.

9. The system of claim 1, wherein to generate the automated incident, the at least one processor is further configured to:
    generate a causal graph based on the generated enriched alert and the identified set of correlation features, wherein the causal graph comprises one or more nodes and one or more edges,
    and wherein each node of the one or more nodes represents a correlation feature of the identified set of correlation features, and each edge of the one or more edges represents a relationship between corresponding correlation features represented by corresponding nodes of the one or more nodes; and
    generate the automated incident associated with the alert based on application of a graph ML model using the generated causal graph and external intelligence data associated with the security breach.

10. The system of claim 9, wherein the at least one processor is further configured to utilize at least one of: a response and feedback associated with a user of the system, or monitoring data associated with the system to generate the causal graph.

11. The system of claim 9, wherein the at least one processor is further configured to:
  transform the generated causal graph to a directed acyclic graph; and
  generate the automated incident associated with the alert based on application of a graph ML model trained to utilize the transformed directed acyclic graph.

12. The system of claim 1, wherein the at least one processor is further configured to:
  generate an incident presentation based on application of an ML model of the generated automated incident associated with the alert, wherein the ML model is based on a natural language processing technique.

13. The system of claim 12, wherein the generated incident presentation corresponds to at least one of: a contextualized alert description, an event summarization associated with the security breach, a tactical graph associated with the security breach, an incident timeline and summary, or an incident graph associated with the generated automated incident.

14. A method for automated incident generation, the method comprising:
  retrieving an alert of a plurality of alerts received from a plurality of heterogeneous sources, wherein the alert of the plurality of alerts is associated with a security breach;
  generating a normalized alert based on normalization of the retrieved alert, wherein the normalization is associated with a semantic similarity parameter;
  generating an enriched alert based on enrichment of the generated normalized alert, wherein the enrichment is based on security related data of the security breach associated with the generated normalized alert;
  identifying a set of correlation features associated with the generated enriched alert; and
  generating the automated incident associated with the alert based on at least the generated enriched alert and the identified set of correlation features associated with the enriched alert.

15. The method of claim 14, further comprising:
  identifying a first predefined rule associated with a field of the retrieved alert, wherein the first predefined rule is based on the semantic similarity parameter associated with the field of the retrieved alert, and wherein the field of the retrieved alert is associated with at least one of: a field name or a field value type of the retrieved alert; and
  normalizing the retrieved alert based on the identified first predefined rule.

16. The method of claim 15, further comprising:
  applying a machine learning (ML) model on the retrieved alert, based on unsuccessful identification of the first predefined rule, to output the normalized alert,
  wherein the ML model is trained to normalize the retrieved alert based on the semantic similarity parameter associated with the field of the retrieved alert.

17. The method of claim 15, further comprising:
  identifying a second predefined rule associated with the security related data of the security breach associated with the normalized alert, wherein the security related data corresponds to at least one of: a tactic of the security breach, a technique of the security breach, a kill chain stage of the security breach, or a scope of the security breach; and
  enriching the normalized alert based on the identified second predefined rule.

18. The method of claim 17, further comprising:
  applying an ML model on the normalized alert, based on unsuccessful identification of the second predefined rule, to output the enriched alert,
  wherein the ML model is trained to enrich the normalized alert based on the security related data of the security breach associated with the normalized alert.

19. The method of claim 14, further comprising:
  receiving a set of alerts of the plurality of alerts received from the plurality of heterogeneous sources; and
  utilizing at least one of: a set of built-in features or a clustering model to identify the set of correlation features associated with the generated enriched alert and the received set of alerts, wherein the clustering model is trained on the set of alerts to identify the set of correlation features associated with the generated enriched alert and the received set of alerts.

20. A computer programmable product comprising a non-transitory computer readable medium having stored thereon computer executable instructions which when executed by at least one processor, cause the at least one processor to carry out operations for generating automated incidents, the operations comprising:
  generating a normalized alert based on normalization of a retrieved alert, wherein the normalization is associated with a semantic similarity parameter;
  generating an enriched alert based on enrichment of the generated normalized alert, wherein the enrichment is based on security related data of the security breach associated with the generated normalized alert;
  identifying a set of correlation features associated with the generated enriched alert; and
  generating the automated incident associated with the alert based on at least the generated enriched alert and the identified set of correlation features associated with the enriched alert.

* * * * *